(12) United States Patent
Jin et al.

(10) Patent No.: US 12,418,061 B2
(45) Date of Patent: Sep. 16, 2025

(54) BATTERY MODULE (71) Applicant: LG Energy Solution, Ltd., Seoul (KR)

(72) Inventors: Hee-Jun Jin, Daejeon (KR);
Kyung-Woo Kim, Daejeon (KR);
Kyung-Mo Kim, Daejeon (KR);
Jeong-O Mun, Daejeon (KR);
Jin-Yong Park, Daejeon (KR);
Jhin-Ha Park, Daejeon (KR); Ho-June Chi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 944 days.

(21) Appl. No.: 17/428,869

(22) PCT Filed: Jun. 18, 2020

(86) PCT No.: PCT/KR2020/007929
§ 371 (c)(1),
(2) Date: Aug. 5, 2021

(87) PCT Pub. No.: WO2021/107305
PCT Pub. Date: Jun. 3, 2021

(65) Prior Publication Data
US 2022/0109199 A1    Apr. 7, 2022

(30) Foreign Application Priority Data

Nov. 26, 2019 (KR) .................. 10-2019-0153704

(51) Int. Cl.
*H01M 10/653*       (2014.01)
*H01M 10/613*       (2014.01)
(Continued)

(52) U.S. Cl.
CPC ....... *H01M 10/653* (2015.04); *H01M 10/613* (2015.04); *H01M 10/625* (2015.04);
(Continued)

(58) Field of Classification Search
CPC ............ H01M 10/647; H01M 50/105; H01M 50/211; H01M 10/613; H01M 10/625;
(Continued)

(56) References Cited

U.S. PATENT DOCUMENTS

2015/0255836 A1    9/2015    Kim
2016/0315294 A1    10/2016   Kim
(Continued)

FOREIGN PATENT DOCUMENTS

CN    107534196 A    1/2018
CN    207183361 U    4/2018
(Continued)

OTHER PUBLICATIONS

Machine translation of Korean Patent Publication No. KR 2014052419A, published May 7, 2014. (Year: 2014).*
(Continued)

*Primary Examiner* — Miriam Stagg
*Assistant Examiner* — Lilia Nedialkova
(74) *Attorney, Agent, or Firm* — Lerner David LLP (57) ABSTRACT

A battery module includes a bottom plate to support a cell stack; a busbar frame having a lower end portion bent in an inward direction along an upper surface of the bottom plate and mounted on the front and rear sides of the cell stack; a thermally conductive resin applied to the upper surface of the bottom plate; and a fence member provided at an end of the lower end portion of the busbar frame and disposed on the upper surface of the bottom plate to prevent the leakage of the thermally conductive resin.

14 Claims, 12 Drawing Sheets

(51) Int. Cl.
*H01M 10/625* (2014.01)
*H01M 10/647* (2014.01)
*H01M 10/6554* (2014.01)
*H01M 50/505* (2021.01)

(52) U.S. Cl.
CPC ..... *H01M 10/647* (2015.04); *H01M 10/6554* (2015.04); *H01M 50/505* (2021.01); *H01M 2220/20* (2013.01)

(58) Field of Classification Search
CPC ........... H01M 10/653; H01M 10/6554; H01M 50/505; H01M 50/507; H01M 2220/20; Y02E 60/10
See application file for complete search history.

(56) References Cited

U.S. PATENT DOCUMENTS

| | | | |
|---|---|---|---|
| 2017/0040635 A1* | 2/2017 | Choi | B23K 35/0255 |
| 2018/0145294 A1 | 5/2018 | Choi et al. | |
| 2018/0194235 A1 | 7/2018 | Kim et al. | |
| 2018/0331336 A1* | 11/2018 | Choi | H01M 10/613 |
| 2019/0067656 A1* | 2/2019 | Zhang | H01M 50/289 |
| 2019/0198952 A1 | 6/2019 | Choi et al. | |
| 2020/0013997 A1* | 1/2020 | Kato | H01M 10/0413 |
| 2020/0168864 A1 | 5/2020 | Seo et al. | |

FOREIGN PATENT DOCUMENTS

| | | | | | |
|---|---|---|---|---|---|
| CN | 109428020 A | | 3/2019 | | |
| CN | 110364655 A | | 10/2019 | | |
| EP | 2838133 B1 | | 9/2016 | | |
| EP | 3343691 A1 | | 7/2018 | | |
| EP | 3451407 A1 | | 3/2019 | | |
| JP | 2015207541 A | | 11/2015 | | |
| JP | 201759299 A | | 3/2017 | | |
| JP | 2017076527 A | | 4/2017 | | |
| JP | 2017142936 A | | 8/2017 | | |
| JP | 2019197664 A | | 11/2019 | | |
| KR | 2014052419 A | * | 5/2014 | .......... | H01M 2/1016 |
| KR | 20170103232 A | | 9/2017 | | |
| KR | 101863703 B1 | | 6/2018 | | |
| KR | 20180092065 A | | 8/2018 | | |
| KR | 101943542 B1 | | 1/2019 | | |
| KR | 20190078521 A | | 7/2019 | | |
| KR | 20190078841 A | | 7/2019 | | |

OTHER PUBLICATIONS

Search Report dated Sep. 11, 2023 from the Office Action for Chinese Application No. 202080008774.2 issued Sep. 13, 2023, 3 pages. [See p. 1-2, categorizing the cited references].
International Search Report for PCT/KR2020/007929 dated Oct. 29, 2020, 2 pgs.
Extended European Search Report for Application No. 20892480.3 dated Jul. 12, 2022. 7 pgs.
Indian Examination Report for Application No. 202117057278 mailed Dec. 6, 2023, 6 Pages.

* cited by examiner

BATTERY MODULE

CROSS-REFERENCE TO RELATED APPLICATIONS

The present application is a national phase entry under 35 U.S.C. § 371 of International Application No. PCT/KR2020/007929 filed on Jun. 18, 2020, which claims priority from Korean Patent Application No. 10-2019-0153704 filed on Nov. 26, 2019, the disclosures of which are incorporated herein by reference in their entirety.

TECHNICAL FIELD

The present disclosure relates to a battery module including pouch-type secondary batteries, and more particularly, a battery module with improved cooling performance by a heat dissipation method through the cell body bottom of pouch-type secondary batteries, and a battery pack and a vehicle including the same.

BACKGROUND ART

In general, a secondary battery may be classified into a can-type secondary battery in which an electrode assembly is embedded in a metal can and a pouch-type secondary battery in which an electrode assembly is embedded in a pouch of an aluminum laminate sheet according to the shape of a case.

Recently, secondary batteries have been widely used not only in small devices such as portable electronic devices, but also in medium- and large-sized devices such as vehicles and energy storage systems. For use in medium-sized device applications, many secondary batteries are electrically connected to increase the capacity and output. In particular, due to advantages of pouch-type secondary batteries that are easy to stack and lightweight, pouch-type secondary batteries are widely used in medium- and large-sized devices.

However, a pouch-type secondary battery is generally packaged in a battery case of a laminate sheet of aluminum and polymer resin, and thus the mechanical strength is low and it is not easy to maintain a stacked state by itself. Accordingly, when constructing a battery module including pouch-type secondary batteries, in many cases, polymer cartridges are used to protect the secondary batteries from external impacts, prevent the secondary batteries from moving, and make it easy to stack the secondary batteries.

The cartridge is generally formed in the shape of a rectangular plate with a hollow center, and in this instance, the outer periphery of the pouch-type secondary battery is surrounded by the four sides. In addition, the battery module is constructed by stacking cartridges, and the secondary batteries may be disposed in an internal empty space created when the cartridges are stacked.

However, when constructing the battery module using the cartridges, fasteners such as bolts or belts are necessary to fix the cartridges. Accordingly, in the conventional battery module structure, additional costs for the cartridges or fasteners are required, and is difficult to assemble, resulting in low process efficiency. In addition, the cartridges or fasteners increase the volume of the battery module, making it difficult to reduce the size of the battery module.

In addition, when the temperature of the secondary battery is higher than the optimal temperature, the performance of the secondary battery may degrade, and in worse cases, explosions or fires may occur. In particular, in a battery module including a stack of pouch-type secondary batteries, the total amount of heat emitted from the secondary batteries in the narrow space may increase the temperature of the battery module faster and more severely. Moreover, battery modules for use in automobile battery packs may be frequently exposed to direct sunlight and placed in high temperature conditions, for example, summer or desert areas. Accordingly, ensuring stable and effective cooling performance is very important to the battery module using secondary batteries.

More recently, a battery module is constructed by adhering and fixing a cell stack to the bottom of a module housing, instead of using a cartridge. In the cell stack, secondary batteries stand vertically upright in close contact with each other. In this instance, Thermal Interface Material (TIM) having good thermal conductivity is used to adhere the cell stack to the module housing, and heat from secondary battery cells is transferred to the bottom of the module housing through the lower surface of the secondary battery cells, and a heat sink is placed on the bottom of the module housing to cool the cell stack.

The conventional battery module has the following problems. That is, in the process of placing the cell stack after applying the TIM to the bottom of the module housing, the TIM leaks out in the front-rear directions of the module housing due to the weight of the cell stack and the viscosity of the TIM. To prevent the TIM leaks, when the TIM is used in a smaller amount, the TIM does not reach the end of the secondary battery cell body, resulting in poor heat dissipation at the two ends of the secondary battery cell, and as a consequence, a difference in temperature between the central area and the two ends of the secondary battery cell increases, resulting in reduced life and performance of the cell. Accordingly, there is a need for a solution to this problem.

DISCLOSURE

Technical Problem

The present disclosure is designed to solve the above-described problem, and therefore the present disclosure is directed to providing a battery module configured to allow a thermal interface material (TIM) such as a thermally conductive resin to be wrapped around the entire bottom of the secondary battery cell body while preventing the TIM from leaking out in the front-rear directions of the battery module when placing the cell stack on the bottom plate after applying the TIM to the bottom plate.

These and other objects and advantages of the present disclosure can be understood by the following description, and will be apparent from the embodiments of the present disclosure. In addition, it will be readily appreciated that the objects and advantages of the present disclosure can be realized by means set forth in the appended claims and a combination thereof.

Technical Solution

To achieve the above-described object, a battery module according to the present disclosure includes a cell stack including a plurality of pouch-type secondary batteries standing upright in up-down directions and arranged in left-right directions, a busbar frame mounted on front and rear sides of the cell stack, a bottom plate made of a thermally conductive material, the bottom plate supporting the cell stack below the cell stack, a thermally conductive resin applied on an upper surface of the bottom plate before the cell stack is placed on the bottom plate, and a fence member disposed in front-rear directions of the bottom plate outside of the thermally conductive resin to prevent the thermally conductive resin from leaking out in front-rear directions when placing the cell stack on the bottom plate.

The busbar frame may have a lower end portion bent and extending in an inward direction of the upper surface of the bottom plate, and the fence member may be provided at an end of the lower end portion of the busbar frame and placed on the upper surface of the bottom plate.

The pouch-type secondary batteries may include a cell body in which an electrode assembly is surrounded by a pouch case, and a cell terrace formed outside of the cell body by heat fusion of the pouch case, and the fence member may be disposed outside of the cell body.

The fence member may have an insertion groove in which part of the cell terrace is inserted in the up-down directions.

The fence member may be formed with a length corresponding to a widthwise direction length of the cell stack, and a greater height than a thickness of the thermally conductive resin applied to the upper surface of the bottom plate.

The thermally conductive resin may have adhesive and thermoplastic properties.

The fence member may be provided in the form of a foam or a pad made of rubber and attached to the bottom plate.

The cell terrace may be formed by partially cutting to prevent contact with an upper part of the fence member.

The busbar frame may include a first busbar frame mounted on a front side of the cell stack and a second busbar frame mounted on a rear side of the cell stack, and the fence member may include a first fence member provided at the lower end portion of the first busbar frame and a second fence member provided at the lower end portion of the second busbar frame.

The battery module may further include a resin isolating member disposed between the first fence member and the second fence member on the upper surface of the bottom plate, the resin isolating member protruding from a surface of the bottom plate and extending in the left-right directions of the bottom plate, and the thermally conductive resin may be applied between the resin isolating member and the first fence member, and between the resin isolating member and the second fence member.

According to another aspect of the present disclosure, there is provided a battery pack including at least one battery module.

According to still another aspect of the present disclosure, there is provided an electric vehicle including at least one battery module.

Advantageous Effects

According to an aspect of the present disclosure, it is possible to allow a thermal interface material (TIM) such as a thermally conductive resin to be wrapped around the entire bottom of the secondary battery cell body while preventing the thermally conductive resin from leaking out in the front-rear directions of the battery module when placing the cell stack on the bottom plate after applying the TIM to the bottom plate.

Accordingly, it is possible to fix the cell stack better by the thermally conductive resin, and improve the heat transfer efficiency at areas near the electrode lead of the secondary battery having higher temperature than the central area, thereby reducing a difference in temperature at each area of the secondary battery, resulting in improved life and performance of the battery module.

DETAILED DESCRIPTION

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation. Therefore, the embodiments described herein and illustrations shown in the drawings are just some preferred embodiments of the present disclosure, but are not intended to fully describe the technical aspects of the present disclosure, so it should be understood that a variety of other equivalents and modifications could have been made thereto at the time that the application was filed.

Figure 1:
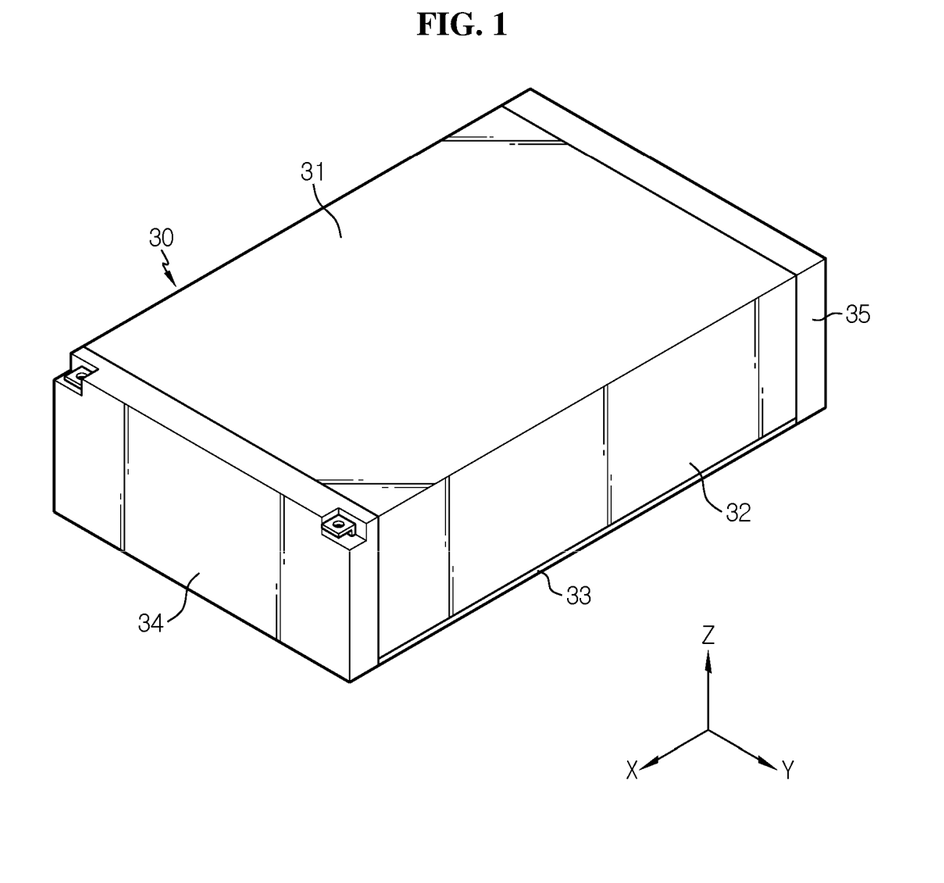
FIG. 1 is a schematic perspective view of a battery module according to an embodiment of the present disclosure.
Figure 2:
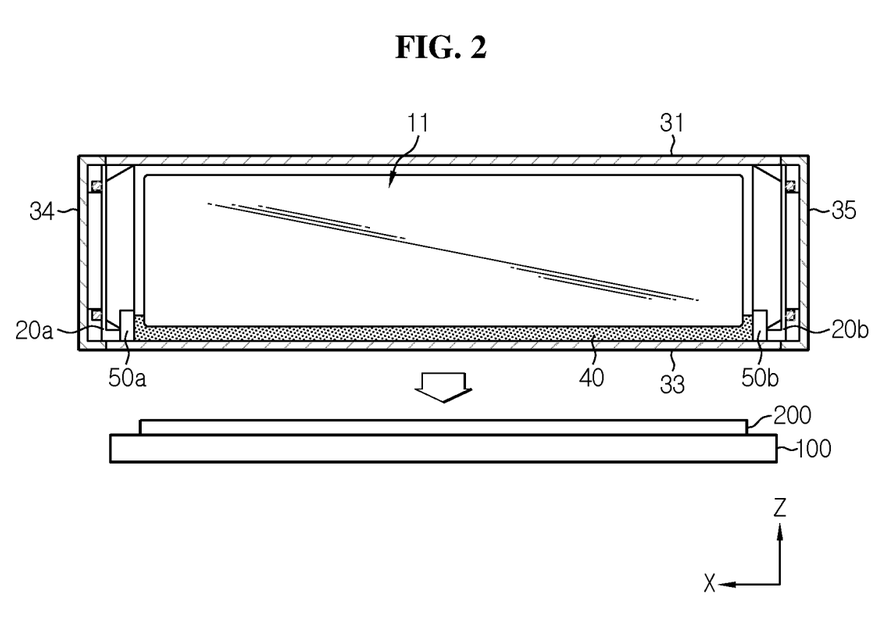
FIG. 2 is a diagram showing a cooling configuration of a battery module according to an embodiment of the present disclosure.
Figure 3:
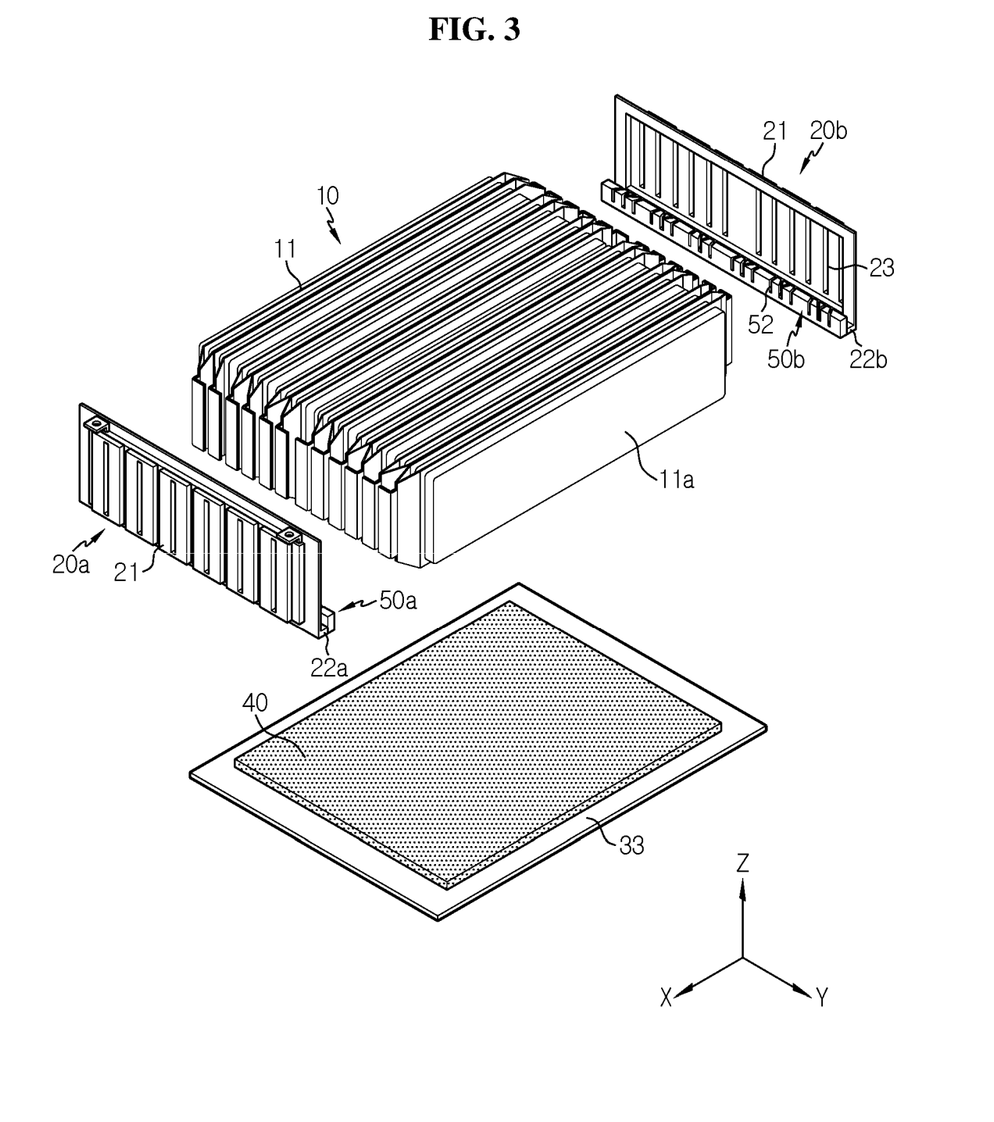
FIG. 3 is a diagram showing a cell stack, a thermally conductive resin provided on an upper surface of a bottom plate, and a fence member provided in a busbar frame according to an embodiment of the present disclosure.

FIG. 1 is a schematic perspective view of a battery module according to an embodiment of the present disclosure, FIG. 2 is a diagram showing a cooling configuration of the battery module according to an embodiment of the present disclosure, and FIG. 3 is a diagram showing a cell stack, a thermally conductive resin provided on an upper surface of a bottom plate, and a fence member provided in a busbar frame according to an embodiment of the present disclosure.

Referring to FIGS. 1 to 3, the battery module according to the present disclosure includes a cell stack 10, a busbar frame 20a, 20b, a module housing 30, a thermally conductive resin 40 and a fence member 50a, 50b.

The cell stack 10 is an assembly of secondary batteries 11, and the secondary batteries 11 are pouch-type secondary batteries. The pouch-type secondary batteries 11 may be arranged in the cell stack 10 in the left-right directions (±Y) upright in the up-down directions (±Z axis).

The pouch-type secondary battery 11 may include an electrode assembly, an electrolyte and a pouch case to package them.

The electrode assembly may include at least one positive electrode plate and at least one negative electrode plate with a separator interposed therebetween. The electrode assembly is well known in the art, and its detailed description will be omitted.

The pouch case may include an outer insulating layer, a metal layer and an inner adhesive layer. In particular, the pouch case may include a metal thin film, for example, an aluminum thin film, to protect the internal components such as the electrode assembly and the electrolyte, improve the electrochemical properties of the electrode assembly and the electrolyte, and enhance heat dissipation. The aluminum thin film may be interposed between the insulating layer formed from an insulating material and the inner adhesive layer to ensure electrical insulation with the internal components of the secondary battery 11 such as the electrode assembly and the electrolyte or other components outside the secondary battery 11.

In addition, the pouch case may include a left pouch sheet and a right pouch sheet, and at least one of the left pouch sheet or the right pouch sheet may have a recessed inner space to form a receiving portion. In addition, the electrode assembly may be received in the receiving portion of the pouch. A sealing part is provided on the outer circumferential surfaces of the left pouch sheet and the right pouch sheet, and the inner adhesive layer of the sealing part may be welded to air-tightly seal the receiving portion in which the electrode assembly is received.

Meanwhile, each electrode plate of the electrode assembly has an electrode tab, and at least one electrode tab may be connected to the electrode lead 11c. In addition, the electrode lead 11c, which is exposed to the outside of the pouch case between the sealing part of the left pouch sheet and the sealing part of the right pouch sheet, may function as an electrode terminal of the secondary battery 11.

Hereinafter, the receiving portion in which the electrode assembly is received in the pouch-type secondary battery 11, that is, part of the electrode assembly surrounded by the pouch case is referred to as a cell body 11a, and the sealing part of the pouch case is referred to as a cell terrace 11b.

The busbar frame 20a and 20b may include a first busbar frame 20a mounted on the front side of the cell stack 10 and a second busbar frame 20b mounted on the rear side of the cell stack 10. The busbar frames 20a and 20b are provided in the shape of a plate having an area that is large enough to cover the front or rear side of the cell stack 10, and slots 23 are formed in the left-right directions on the surface of the plate into which the electrode leads 11c of the secondary battery 11 are inserted and pass through in the front-rear directions.

In addition, a plurality of busbars 21 provided in the form of a metal plate may be provided in a predetermined pattern on the front surface of the busbar frames 20a and 20b. For example, the positive electrode leads of two or more secondary batteries 11 are held together, drawn out of the busbar frames 20a and 20b frontwards through the slots 23, bent at the ends, placed in contact with the busbars 21 in parallel, and welded together. Likewise, the negative electrode leads of two or more other secondary batteries 11 are welded to the same busbar 21. In this way, all the secondary batteries 11 of the cell stack 10 may be electrically connected in series and in parallel.

In addition, the busbar frames 20a and 20b according to the present disclosure have lower end portions 22a and 22b bent and extended in an inward direction of the upper surface of the bottom plate 33. That is, the lower end portions 22a and 22b of the busbar frames may be horizontally disposed adjacent to the lower end of the cell body 11a when the busbar frames 20a and 20b and the cell stack 10 are connected, and when the cell stack 10 is placed on the upper surface of the bottom plate 33, the lower end portions 22a and 22b of the busbar frames may contact the upper surface of the bottom plate 33. Although described later, the fence member 50a and 50b may be provided at the ends of the lower end portions 22a and 22b of the busbar frames.

The module housing 30 is the component that forms the external shape of the battery module, and may include a top plate 31 that covers the top of the cell stack 10, a pair of side plates 32 that cover the left and right sides of the cell stack 10, a bottom plate 33 that supports the cell stack 10 below the cell stack 10, and a module front cover 34 and a module rear cover 35 to prevent the busbars 21 of the busbar frames 20a and 20b from being exposed to the outside.

The module housing 30 may serve to protect the cell stack 10 and the busbar frames 20a and 20b from external impacts. Accordingly, the module housing 30 may be made of metal such as steel to ensure strength. The module housing 30 is not necessarily limited to metal, and may be made of any material having strength.

In particular, as shown in FIG. 2, in the battery module according to the present disclosure, at least the bottom plate 33 of the module housing 30 may be made of a thermally conductive material for heat dissipation of the battery module by the contact of the heat sink 100 with the lower surface of the bottom plate 33 of the module housing 30. When the heat sink 100 is disposed on the lower surface of the bottom plate 33, a thermal interface material 200 (TIM) may be used between the structures to reduce a difference in surface roughness between the structures and lower the thermal contact resistance.

Referring to FIG. 3, the thermally conductive resin 40 having adhesive and thermoplastic properties may be applied to the upper surface of the bottom plate 33. The cell stack 10 includes the pouch-type secondary batteries 11 stacked and arranged in the left-right directions (±Y axis), and the lower end portion of each pouch-type secondary battery 11 may be placed on the upper surface of the bottom plate 33. In this instance, the thermally conductive resin 40 may be interposed between the lower end portion of the pouch-type secondary batteries 11 and the upper surface of the bottom plate 33. That is, the thermally conductive resin 40 may be applied to the upper surface of the bottom plate 33, and the pouch-type secondary batteries 11 and the bottom plate 33 may be adhered and fixed to each other through the thermally conductive resin 40.

According to this configuration of the present disclosure, the pouch-type secondary batteries 11 may be fixed to the bottom plate 33 through the thermally conductive resin 40 in a simple manner, and the battery module does not need a fastener such as a bolt or a cartridge to fix the pouch-type secondary batteries 11. Thus, according to this aspect of the present disclosure, it is possible to simplify the structure and assembling of the battery module, and reduce the number of components.

In addition, it is possible to decrease the distance between the pouch-type secondary batteries 11 and the bottom plate 33 and reduce the number of contacts between the components, thereby effectively transferring heat generated from the pouch-type secondary batteries 11 to the bottom plate 33. Moreover, it is possible to eliminate an air layer from a space between the pouch-type secondary batteries 11 and the bottom plate 33 or reduce the air layer, thereby preventing a decrease in heat transfer due to the air layer. The thermally conductive resin 40 may include different types of thermally conductive adhesives, and the battery module according to an embodiment of the present disclosure may use different types of organic and/or inorganic thermally conductive adhesives, for example, thermally conductive epoxy adhesives, thermally conductive silicon adhesives and thermally conductive urethane adhesives.

The thermally conductive resin 40 has higher thermal conductivity than general adhesives, so it is possible to further increase the heat transfer amount and the heat transfer rate between the pouch-type secondary batteries 11 and the bottom plate 33. Accordingly, it is possible to further improve the heat dissipation performance of the secondary batteries 11 through the bottom plate 33, thereby further improving the cooling performance of the battery module.

In particular, the battery module according to the present disclosure includes the fence member 50a and 50b formed to have a predetermined height from the upper surface of the bottom plate 33. The fence member 50a, 50b may have a length corresponding to the length of the cell stack 10 in the widthwise direction (±Y axis), and a greater height than the thickness of the thermally conductive resin 40 applied to the upper surface of the bottom plate 33.

The fence member 50a, 50b is disposed outside of the thermally conductive resin 40 along the front-rear direction of the bottom plate 33 on the upper surface of the bottom plate 33 to prevent the thermally conductive resin 40 from leaking out in the front-rear directions when placing the cell stack 10 on the bottom plate 33.

Figure 4:
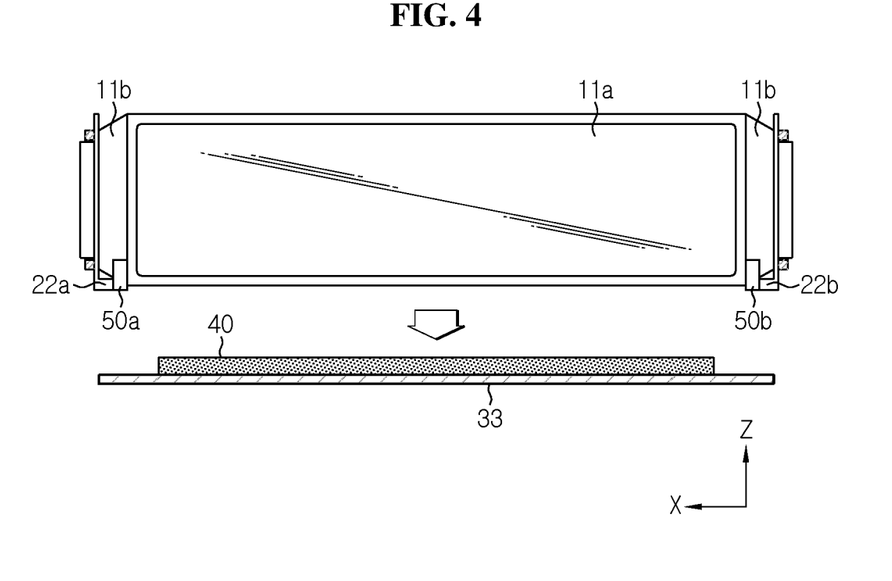
FIGS. 4 and 5 are diagrams showing the distribution of thermally conductive resin interposed between an upper surface of a bottom plate and a bottom of a cell stack according to an embodiment of the present disclosure.
Figure 5:
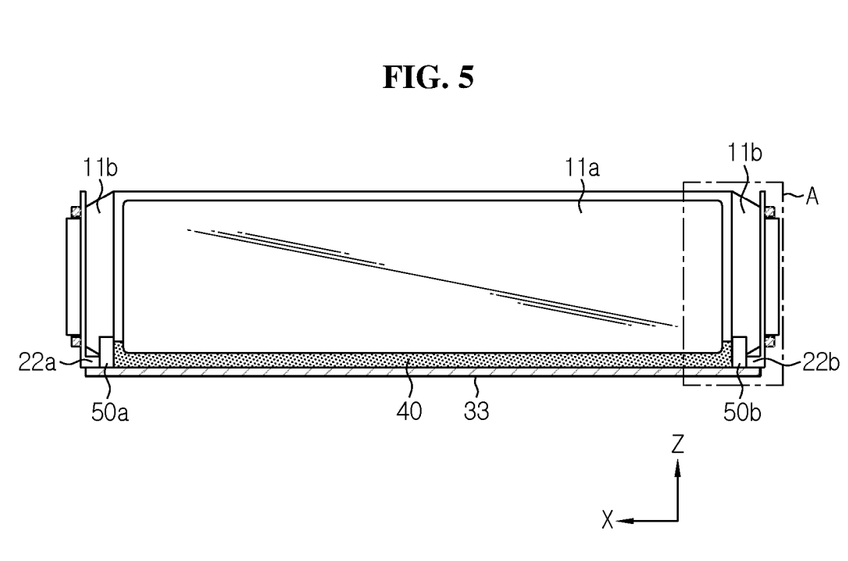

More specifically, referring to FIGS. 3 to 5, the fence member 50a and 50b may include a first fence member 50a provided at the lower end portion of the first busbar frame 20a, and a second fence member 50b provided at the lower end portion of the frame 20b.

The first fence member 50a and the second fence member 50b may be, for example, a memory foam or a rubber pad to absorb impacts, and may be attached to and detached from the ends of the lower end portions 22a and 22b of the busbar frame. However, dissimilar to this embodiment, the first fence member 50a and the second fence member 50b may be integrally formed with the busbar frames 20a and 20b, respectively.

In addition, the first fence member 50a and the second fence member 50b may be disposed outside of the lower end portion of the cell body 11a in the front-rear direction (X-axis direction) of the battery module, that is, the lower end portion region of the cell terrace 11b.

In this case, the fence members 50a and 50b may interfere with the lower end portion of the cell terrace 11b. Accordingly, the fence members 50a and 50b according to the present embodiment have an insertion groove 52 in which the lower end portion of the cell terrace 11b is inserted in the up-down directions to avoid contact between the cell terraces 11b.

Figure 7:
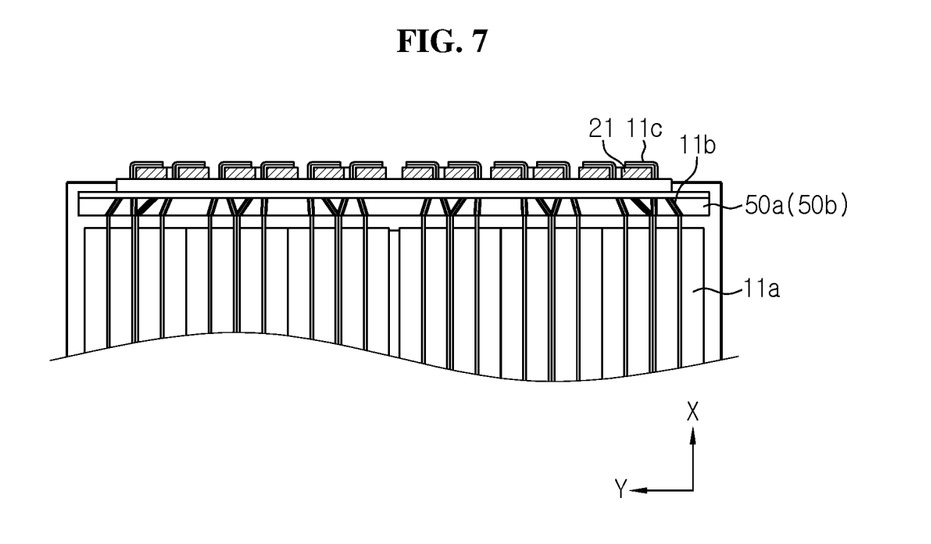
FIG. 7 is a schematic plan view of an edge region of FIG. 5 when viewed from the top.

The insertion groove 52 of the fence members 50a and 50b is provided in the corresponding number to the number of secondary batteries 11. Each of the cell terraces 11b (see FIG. 7) may extend while being bent at a predetermined angle with respect to the X-axis to hold the electrode leads 11c together and bring them into contact with the busbar 21.

The insertion grooves 52 may be formed by partially cutting the bodies of the fence members 50a and 50b at different angles corresponding to the arrangement structure of the cell terraces 11b.

The thermally conductive resin 40 may spread out due to the weight of the cell stack 10 when placing the cell stack 10 on the bottom plate 33, although to different extents depending on the viscosity. Although not shown, the movement of the thermally conductive resin 40 in the left-right directions (±Y axis) may be may be blocked and restricted by the side plate 32 of the module housing 30. However, in case there are no fence members 50a, 50b, when the thermally conductive resin 40 moves in the front-rear direction (±X axis) away from the cell body 11a of the secondary batteries 11, the adhesion and fixation between the cell stack 10 and the bottom plate 33 may be weakened, and further, the cell terrace 11b or the busbar frames 20a and 20b may be adversely affected. On the other hand, when the thermally conductive resin 40 is applied in a smaller amount to prevent the thermally conductive resin 40 from spreading too wide due to the weight of the cell stack 10, some of the thermally conductive resin 40 may not contact the bottom of the cell body 11a, and in this case, the cell stack 10 may be poorly fixed and the thermal conductivity may be reduced.

Accordingly, taking into account the above situation, in this embodiment, as shown in FIG. 4, the thermally conductive resin 40 is applied to the upper surface of the bottom plate 33 over an area which is approximately equal to or slightly smaller than the area of the lower end portion of the cell body 11a of the entire secondary battery 11, so even if the thermally conductive resin 40 moves in the front-rear direction (±X-axis direction) when placing the cell stack 10, the thermally conductive resin 40 is blocked by the first fence member 50a and the second fence member 50b as shown in FIG. 5, thereby preventing the thermally conductive resin 40 from leaking out of the cell body 11a.

Figure 6:
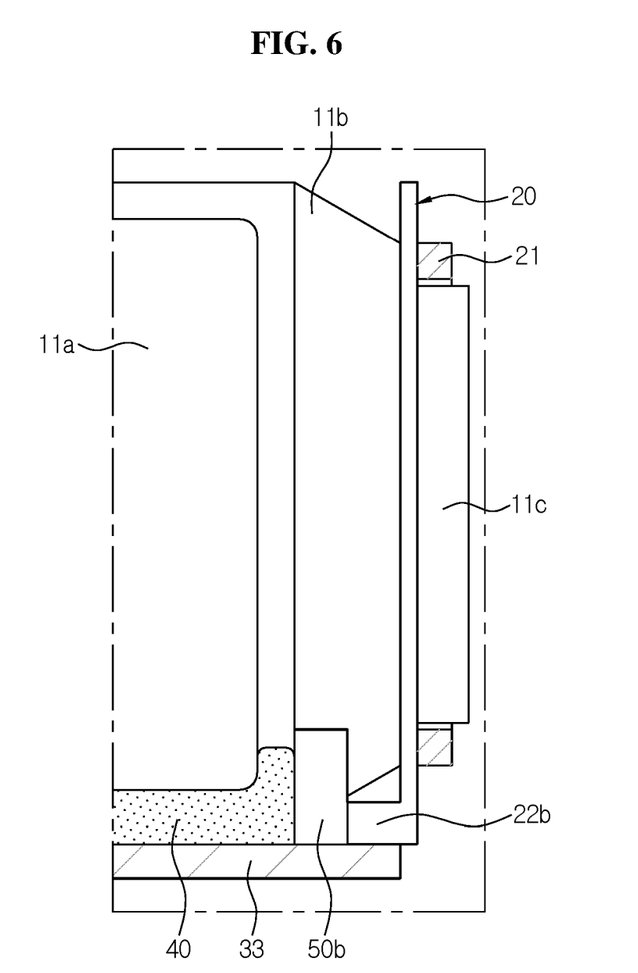
FIG. 6 is an enlarged view of section A of FIG. 5.

That is, according to this configuration of the present disclosure, even if the thermally conductive resin 40 moves in the front-rear directions due to the weight of the cell stack 10 when placing the cell stack 10 on the upper surface of the bottom plate 33, the leakage of the thermally conductive resin 40 out of the cell body 11a is prevented by the first fence member 50a and the second fence member 50b. Accordingly, as shown in FIG. 6, the thermally conductive resin 40 is wrapped around the end of the cell body 11a along the fence members 50a and 50b, and after cured, the thermally conductive resin 40 completely covers the entire bottom of the cell body 11a, thereby increasing the amount of heat transfer between the secondary batteries 11, the thermally conductive resin 40 and the bottom plate 33, resulting in further improved cooling performance. In particular, higher temperature heat at the end of the cell body 11a may be effectively transferred to the bottom plate 33, thereby reducing a difference in temperature at each area of the secondary batteries 11, resulting in improved life and performance of the secondary batteries 11.

Subsequently, another embodiment of the present disclosure will be described with reference to the following drawings.

Figure 8:
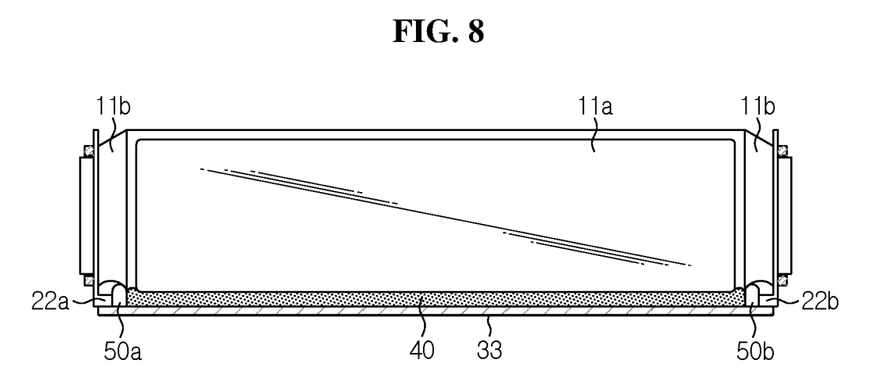
FIG. 8 is a schematic diagram showing the main components of a battery module using a secondary battery with a partially cut cell terrace according to another embodiment of the present disclosure.
Figure 9:
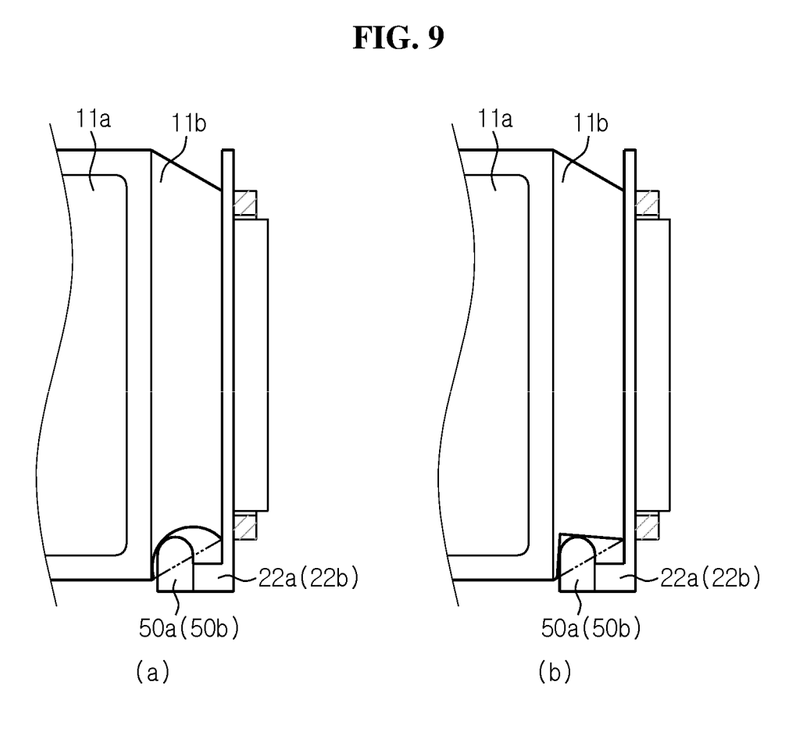
FIG. 9 is an enlarged diagram showing the cell terrace of the secondary battery of FIG. 8 and its variation.

FIG. 8 is a schematic diagram showing the main components of the battery module using the secondary battery 11 with the partially cut cell terrace 11b according to another embodiment of the present disclosure, and FIG. 9 is a diagram showing the cell terrace 11b of the secondary battery 11 of FIG. 8 and its variation.

The same reference numerals as those in the previous drawings denote the same elements, and redundant descriptions will be omitted herein, and differences from the above-described embodiments will be mainly described.

In the above-described embodiment, the insertion groove 52 is formed in the fence members 50a, 50b to avoid the interference between the lower end portion of the cell terrace 11b and the fence members 50a, 50b, while in this embodiment, instead of the insertion groove 52, as shown in FIG. 8, the lower end portion of the cell terrace 11b is cut into a predetermined shape to prevent the contact with the upper part of the fence members 50a and 50b. The lower end portion of the cell terrace 11b may be cut to conform to the shape of the fence members 50a and 50b, for example, in a round shape as shown in (a) of FIG. 9 or in an angled shape as shown in (b) of FIG. 9.

According to this embodiment, when the cell stack 10 is placed on the bottom plate 33, it is necessary to individually insert the lower end portions of the cell terraces 11b into the insertion grooves 52 of the fence members 50a, 50b, and it is difficult to place the fence members 50a and 50b in the right position at the lower end portion of the cell terrace 11b, but these disadvantages are all solved, and it is possible to connect the cell stack 10 and the busbar frames 20a and 20b more easily and faster than the above-described embodiment. In addition, the insertion grooves 52 may not be formed in the fence members 50a and 50b to simplify the structure of the fence members 50a and 50b and reduce the manufacturing cost.

Meanwhile, in a similar way to this embodiment, the lower end portion of the cell terrace 11b may be bent or folded to avoid interference with the fence members 50a and 50b.

Subsequently, another embodiment of the present disclosure will be described with reference to the following drawings.

Figure 10:
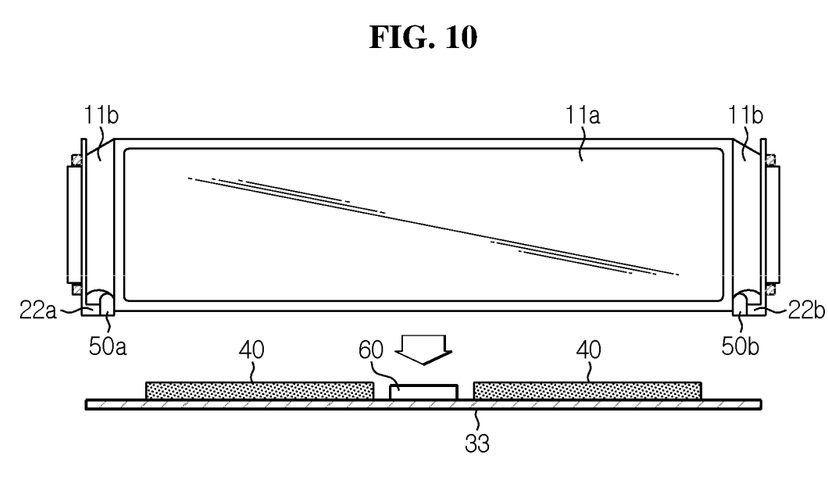
FIGS. 10 and 11 are diagrams showing the distribution of thermally conductive resin interposed between an upper surface of a bottom plate and a bottom of a cell stack according to another embodiment of the present disclosure.
Figure 11:
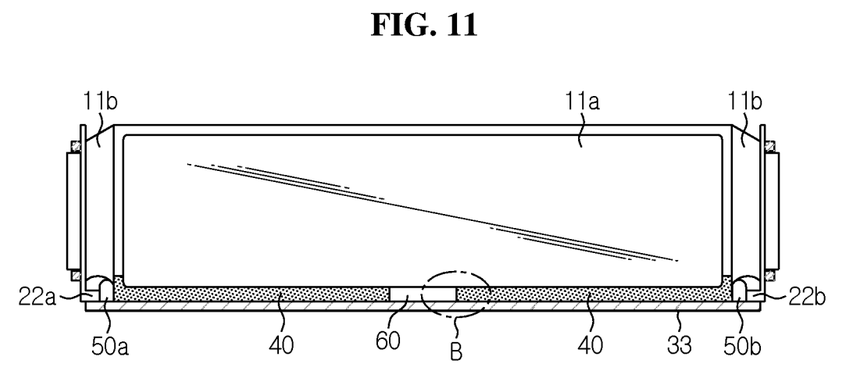
Figure 12:
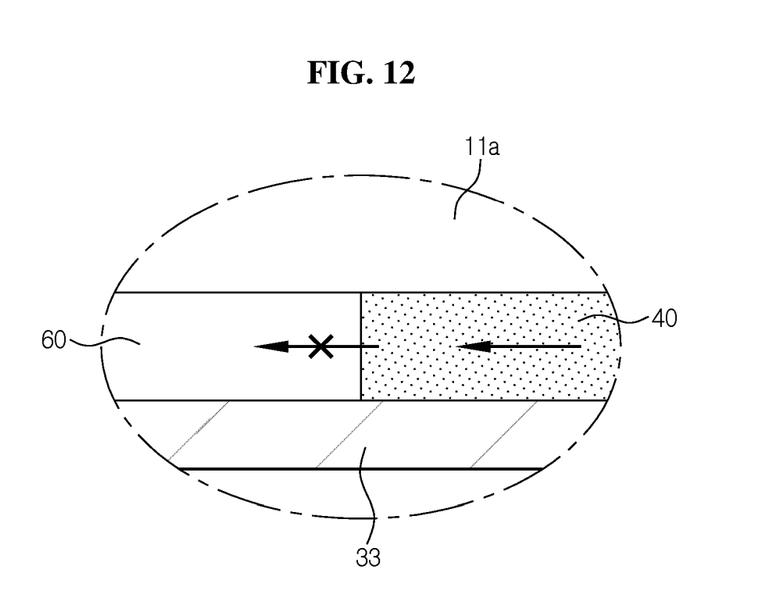
FIG. 12 is an enlarged view of section B of FIG. 11.

FIGS. 10 and 11 are diagrams showing the distribution of the thermally conductive resin 40 interposed between the upper surface of the bottom plate 33 and the bottom of the cell stack 10 according to another embodiment of the present disclosure, and FIG. 12 is an enlarged view of section B of FIG. 11.

The same reference numerals as those in the previous drawings denote the same elements, and redundant descriptions of the same elements will be omitted herein, and differences from the above-described embodiments will be mainly described.

The battery module according to another embodiment of the present disclosure further includes a resin isolating member 60.

The resin isolating member 60 may protrude from the surface of the bottom plate 33 and extend in the left-right direction (±Y axis) of the bottom plate 33. The resin isolating member 60 may be provided in the form of a pad that is similar to the above-described fence members 50a and 50b and may be attached to the center of the bottom plate 33. In this embodiment, the thermally conductive resin 40 may be applied between the resin isolating member 60 and the first fence member 50a, and between the resin isolating member 60 and the second fence member 50b.

According to the configuration of this embodiment, the resin isolating member 60 supports the center of the cell body 11a to induce the uniform distribution of the thermally conductive resin 40 in the front-rear directions (±X axis) along the bottom of the cell body 11a. In particular, due to the characteristics of the pouch-type secondary batteries 11, the temperature at the edge of the cell body 11a is higher than the temperature at the center of the cell body 11a, so when the resin isolating member 60 is disposed at the center of the cell body 11a, it is possible to block the heat transfer from the edge of the cell body 11a to the center of the cell body 11a, thereby reducing a difference in temperature at each area of the secondary batteries 11. In addition, it is possible to reduce the amount of the thermally conductive resin 40 as much as the space occupied by the resin isolating member 60, thereby achieving cost savings.

Meanwhile, a battery pack according to the present disclosure may include one or more battery modules according to the present disclosure. In addition to the battery module, the battery pack according to the present disclosure may further include a pack case to receive the battery module, different types of devices to control the charge/discharge of the battery module, for example, a battery management system (BMS), a current sensor, a fuse, etc.

The battery module according to the present disclosure may be applied to vehicles such as electric vehicles or hybrid electric vehicles. That is, the vehicle according to the present disclosure may include the battery module according to the present disclosure. In particular, in the case of vehicles that obtain driving power from batteries, such as electric vehicles, the cooling performance of the battery module is very important. Accordingly, when the battery module according to the present disclosure is applied to vehicles, it is possible to provide stable and safe battery modules with effective cooling performance.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

It should be noted that the terms indicating directions as used herein such as up, down, left and right are used for convenience of description only, and it is obvious to those skilled in the art that the term may change depending on the position of the stated element or an observer.

What is claimed is:

1. A battery module comprising:
   a cell stack including a plurality of pouch-type secondary batteries stacked along a stacking dimension;
   a first busbar frame mounted on a first end of the cell stack, the first end of the cell stack being opposite to a second end of the cell stack along a first dimension;
   a support plate made of a thermally conductive material, the support plate supporting the cell stack on one side of the cell stack in a second dimension orthogonal to the first dimension;
   a thermally conductive resin applied on an inner surface of the support plate between the cell stack and the support plate; and
   a first fence member disposed along the support plate outside of the thermally conductive resin in the first dimension, the first fence member defining a linear boundary abutting and extending along the inner surface of the support plate in the stacking dimension so as to prevent the thermally conductive resin from leaking out past the linear boundary along the first dimension when the cell stack is placed on the support plate, wherein the linear boundary has a length along the stacking dimension that spans a length of the cell stack along the stacking dimension, and wherein the first fence member has a height along the second dimension that is less than a height of the first busbar frame along the second dimension, wherein the first busbar frame has an end portion extending in the first dimension inwardly towards a center of the support plate along the inner surface of the support plate, and wherein the first fence member is located at an end of the end portion of the first busbar frame and is positioned on the inner surface of the support plate.

2. The battery module according to claim 1, wherein the pouch-type secondary batteries each include:

a cell body in which an electrode assembly is surrounded by a pouch case; and a cell terrace formed outside of the cell body by heat fusion of the pouch case, wherein the first fence member is disposed outside of the cell body.

3. The battery module according to claim 2, wherein the first fence member has an insertion groove which receives at least a portion of the cell terrace.

4. The battery module according to claim 2, wherein the cell terrace includes a cut portion to prevent contact with a part of the first fence member extending away from the support plate in the second dimension.

5. The battery module according to claim 2, further comprising:

a second busbar frame positioned at the second end of the cell stack; and a second fence member provided at an end portion of the second busbar frame.

6. The battery module according to claim 5, further comprising:

a resin isolating member disposed between the first fence member and the second fence member on the inner surface of the support plate, the resin isolating member protruding from the inner surface of the bottom plate and extending longitudinally along the bottom plate in the stacking dimension, wherein the thermally conductive resin is applied between the resin isolating member and the first fence member, and the thermally conductive resin is applied between the resin isolating member and the second fence member.

7. The battery module according to claim 1, wherein the first fence member has a height along the second dimension that is greater than a thickness of the thermally conductive resin applied to the inner surface of the support plate.

8. The battery module according to claim 1, wherein the thermally conductive resin has adhesive and thermoplastic properties.

9. The battery module according to claim 1, wherein the first fence member comprises a foam or a rubber pad attached to the end portion of the busbar frame.

10. A battery pack comprising the battery module according to claim 1.

11. An electric vehicle comprising the battery module according to claim 1.

12. The battery module according to claim 1, wherein the stacking dimension is orthogonal to both the first dimension and the second dimension.

13. The battery module according to claim 1, wherein the first busbar frame has a planar portion extending along the stacking dimension and along the second dimension, the planar portion including a plurality of slots configured to receive electrode leads of the plurality of pouch-type secondary batteries therethrough, and wherein the end portion of the first busbar frame projects from the planar portion of the first busbar frame in the first dimension towards the center of the support plate such that the first fence member located at the end of the end portion is spaced apart from the planar portion in the first dimension.

14. The battery module according to claim 1, wherein the first fence member has a longitudinal dimension extending along the support plate in the stacking dimension.

* * * * *